United States Patent
Lu

(10) Patent No.: US 9,453,119 B2
(45) Date of Patent: *Sep. 27, 2016

(54) POLYMER COMPOSITION FOR PRODUCING ARTICLES WITH LIGHT REFLECTIVE PROPERTIES

(75) Inventor: Bing Lu, Union, KY (US)

(73) Assignee: Ticona LLC, Florence, KY (US)

(*) Notice: Subject to any disclaimer, the term of this patent is extended or adjusted under 35 U.S.C. 154(b) by 129 days.

This patent is subject to a terminal disclaimer.

(21) Appl. No.: 14/111,735

(22) PCT Filed: Apr. 5, 2012

(86) PCT No.: PCT/US2012/032272
§ 371 (c)(1),
(2), (4) Date: Jan. 27, 2014

(87) PCT Pub. No.: WO2012/141967
PCT Pub. Date: Oct. 18, 2012

(65) Prior Publication Data
US 2014/0128504 A1 May 8, 2014

Related U.S. Application Data

(63) Continuation-in-part of application No. 13/086,763, filed on Apr. 14, 2011, which is a continuation-in-part of application No. 13/086,805, filed as application No. PCT/US2012/032272 on Apr. 5, 2012, now Pat. No. 9,062,198.

(60) Provisional application No. 61/581,812, filed on Dec. 30, 2011.

(51) Int. Cl.
| | |
|---|---|
| C08L 27/18 | (2006.01) |
| C08K 7/14 | (2006.01) |
| C08K 3/00 | (2006.01) |
| C08L 67/02 | (2006.01) |
| C08L 23/08 | (2006.01) |
| C08L 25/14 | (2006.01) |
| C08L 63/00 | (2006.01) |
| C08L 71/10 | (2006.01) |

(52) U.S. Cl.
CPC ............ C08K 7/14 (2013.01); C08K 3/0033 (2013.01); C08L 67/02 (2013.01); C08L 23/0884 (2013.01); C08L 25/14 (2013.01); C08L 27/18 (2013.01); C08L 63/00 (2013.01); C08L 71/10 (2013.01)

(58) Field of Classification Search
CPC .................................................... C08K 7/14
USPC ....................................................... 523/400
See application file for complete search history.

(56) References Cited

U.S. PATENT DOCUMENTS

| | | | |
|---|---|---|---|
| 4,111,892 A | 9/1978 | Kamada et al. | |
| 4,608,623 A | 8/1986 | Stephano | |
| 4,753,890 A | 6/1988 | Smith-Lewis et al. | |
| 4,753,980 A | 6/1988 | Deyrup | |
| 4,859,732 A | 8/1989 | Minnick | |
| 4,999,055 A | 3/1991 | Holtzen et al. | |
| 5,015,942 A | 5/1991 | Kolanko | |
| 5,207,967 A | 5/1993 | Small, Jr. et al. | |
| 5,254,288 A * | 10/1993 | Verheijen ............. | C08G 63/183 252/500 |
| 5,256,787 A | 10/1993 | Borzatta et al. | |
| 5,428,086 A | 6/1995 | Minnick et al. | |
| 5,596,049 A | 1/1997 | Gallucci et al. | |
| 5,707,437 A | 1/1998 | Niedenzu et al. | |
| 5,965,261 A | 10/1999 | Webster | |
| 6,093,765 A | 7/2000 | Cottis | |
| 6,197,873 B1 | 3/2001 | Miyata et al. | |
| 6,236,061 B1 | 5/2001 | Walpita | |
| 6,707,437 B1 | 3/2004 | Kuno | |
| 6,878,972 B2 | 4/2005 | Waalib-Singh et al. | |
| 7,381,996 B2 | 6/2008 | Hsin Chen | |
| 7,709,568 B2 | 5/2010 | Bersted et al. | |
| 7,999,280 B2 | 8/2011 | Kim et al. | |
| 8,007,885 B2 | 8/2011 | Topoulos | |
| 8,070,316 B2 | 12/2011 | Urano et al. | |
| 8,288,793 B2 | 10/2012 | Kim et al. | |
| 8,318,847 B2 | 11/2012 | Cao et al. | |
| 8,480,254 B2 | 7/2013 | Lu | |
| 8,545,718 B2 | 10/2013 | Nakayama et al. | |
| 2003/0065106 A1 | 4/2003 | Ambrose | |

(Continued)

FOREIGN PATENT DOCUMENTS

| | | |
|---|---|---|
| CN | 101565538 A | 10/2009 |
| EP | 0273149 | 6/1988 |

(Continued)

OTHER PUBLICATIONS

International Search Report and Written Opinion for Application PCT/US2012/032272 mailed Jun. 27, 2012.
DuPont Ti-Pure®; "Titanium Dioxide for Coatings"; Jun. 2007; pp. 1-28.
IARC Working Group on the Evaluation of Carcinogenic Risks to Humans: "Titanium Dioxide" in IARC Monographs on the Evaluation of Carcinogenic Risks to Humans, Carbon Black, Titanium Dioxide and Talc. IARC Monographs, vol. 93, 2010; pp. 193-214.
Temple C. Patton, "Pigment Handbook, vol. II, Applications and markets"; John Wiley & Sons; dated 1973.

*Primary Examiner* — Doris Lee
(74) *Attorney, Agent, or Firm* — Dority & Manning, P.A.

(57) ABSTRACT

Polymer compositions are described containing a thermoplastic polymer in combination with one or more components, such as a white pigment and optionally one or more reinforcing fillers. In one embodiment, the polymer composition can be formulated to have high reflective properties. In other embodiments, the polymer composition can be formulated so as to have desired melt flow characteristics. In still another embodiment, the polymer composition can be formulated so as to have desired mechanical properties, such as impact resistance.

27 Claims, 3 Drawing Sheets

(56) References Cited

U.S. PATENT DOCUMENTS

| | | |
|---|---|---|
| 2003/0096122 A1 | 5/2003 | Mercx et al. |
| 2003/0109629 A1 | 6/2003 | Pierre et al. |
| 2003/0178221 A1 | 9/2003 | Chiu et al. |
| 2004/0156213 A1 | 8/2004 | Lodhie |
| 2005/0007772 A1 | 1/2005 | Yen |
| 2005/0043483 A1 | 2/2005 | Kim et al. |
| 2005/0118393 A1 | 6/2005 | Corcoran et al. |
| 2005/0176835 A1 | 8/2005 | Kobayashi et al. |
| 2006/0230553 A1 | 10/2006 | Thullen et al. |
| 2007/0155913 A1 | 7/2007 | Chakravarti et al. |
| 2007/0213458 A1* | 9/2007 | Topoulos ............... C08K 5/005 524/601 |
| 2009/0014505 A1 | 1/2009 | Cretegny et al. |
| 2009/0141505 A1 | 6/2009 | Ushiki et al. |
| 2009/0277858 A1 | 11/2009 | Mitadera et al. |
| 2010/0032702 A1 | 2/2010 | Lahijani |
| 2010/0051999 A1 | 3/2010 | Iwase et al. |
| 2010/0200882 A1 | 8/2010 | Kotani et al. |
| 2010/0309571 A1 | 12/2010 | Watari et al. |
| 2011/0189453 A1 | 8/2011 | Leemans et al. |
| 2011/0310622 A1 | 12/2011 | Topoulos |
| 2012/0097894 A1 | 4/2012 | Nakayama et al. |
| 2012/0262927 A1 | 10/2012 | Lu |
| 2012/0264868 A1 | 10/2012 | Lu |
| 2013/0158184 A1 | 6/2013 | Topoulos |

FOREIGN PATENT DOCUMENTS

| | | |
|---|---|---|
| EP | 0485240 A1 | 5/1992 |
| EP | 0 684 648 A2 | 11/1995 |
| EP | 1798268 | 6/2007 |
| JP | 55027335 A | 2/1980 |
| JP | 03084060 | 9/1991 |
| JP | 04142362 | 5/1992 |
| JP | H06151977 | 5/1994 |
| JP | 11087780 A | 3/1999 |
| JP | 2002302596 A | 10/2002 |
| JP | 2003124521 | 4/2003 |
| JP | 2003262701 A | 9/2003 |
| JP | 2005038661 A | 2/2005 |
| WO | WO 02/052615 A2 | 7/2002 |
| WO | WO 03/085029 A1 | 10/2003 |
| WO | WO 2008/002362 A1 | 1/2008 |
| WO | WO 2010/049531 A1 | 5/2010 |
| WO | WO 2011/040138 A1 | 7/2011 |
| WO | WO 2013/101277 A1 | 4/2013 |

* cited by examiner

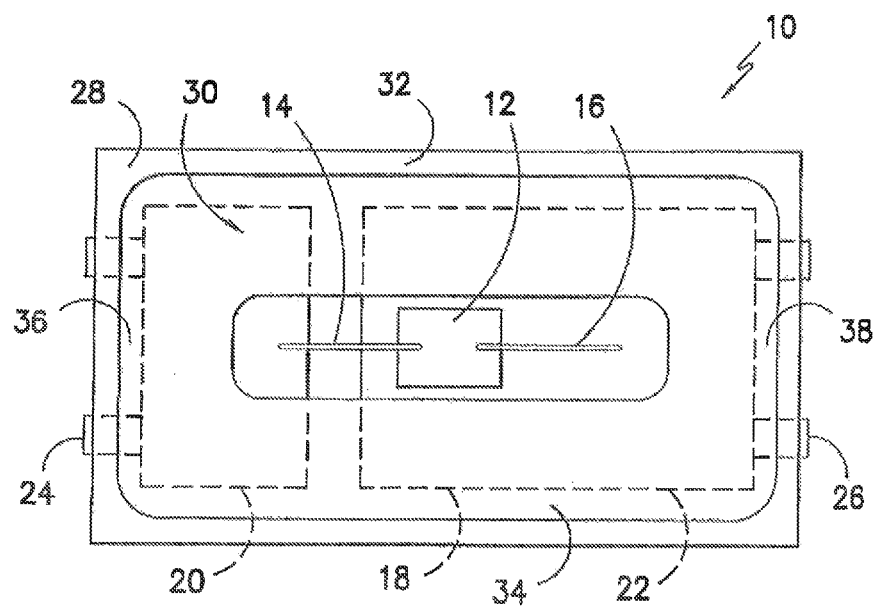
FIG. -1-
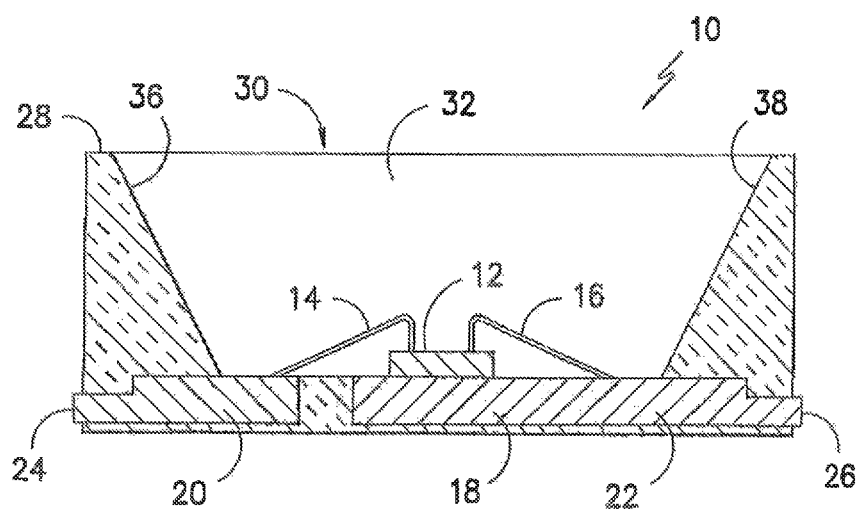
FIG. -2-

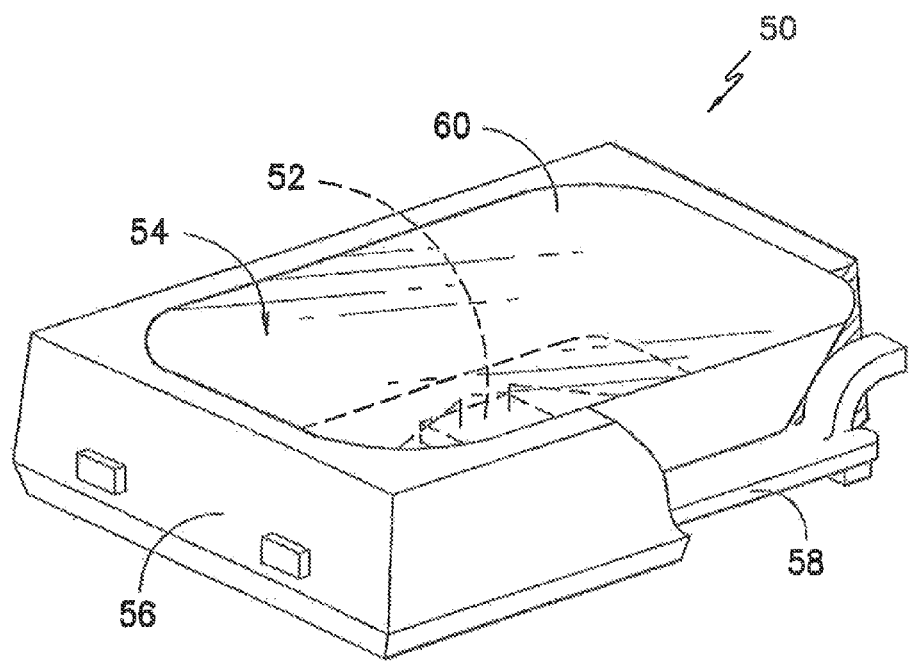
FIG. -3-
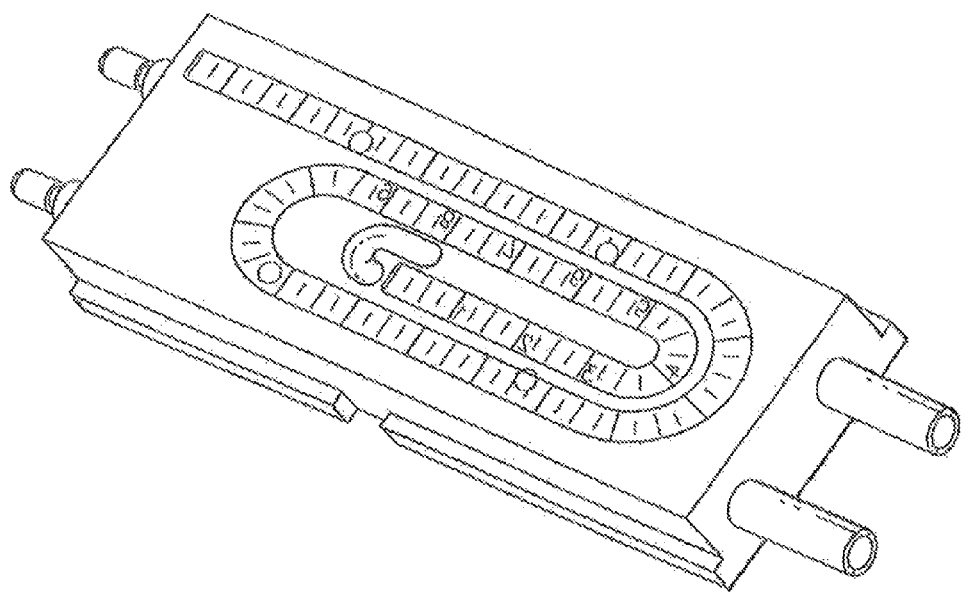
FIG. -4-

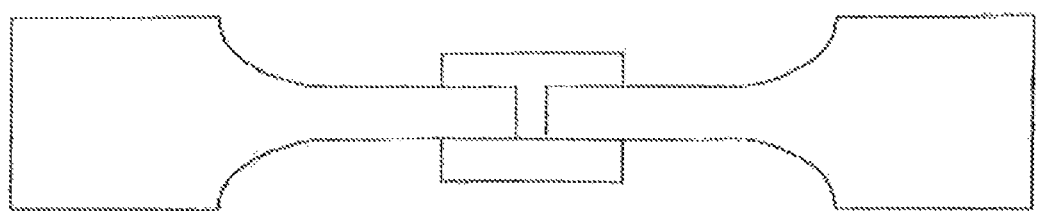
FIG. -5-

POLYMER COMPOSITION FOR PRODUCING ARTICLES WITH LIGHT REFLECTIVE PROPERTIES

RELATED APPLICATIONS

The present application claims priority to PCT International Application Serial No. PCT/US2012/032272 filed Apr. 5, 2012, which is a continuation-in-part and claims filing benefit of U.S. patent application Ser. No. 13/086,763 filed on Apr. 14, 2011, and which is a continuation-in-part and claims filing benefit of U.S. patent application Ser. No. 13/086,805 filed Apr. 14, 2011, and claims benefit of U.S. Provisional Patent Application Ser. No. 61/581,812 filed on Dec. 30, 2011, which are hereby incorporated by reference in their entirety.

BACKGROUND

There are numerous and different types of applications where plastic articles are desired that have good light reflective properties. For example, such articles may be used as a reflector for a light source. The reflector may be designed to reflect light in a certain direction or in all directions. Highly reflective articles may also have usefulness to produce signs. The reflective material may be used to accentuate a word, phrase or symbol appearing on the sign. For instance, in one embodiment, the sign may include a light source that is surrounded by the highly reflective material.

Highly reflective polymer materials may also be well suited for use in labels to accentuate the printed matter on the label or design appearing on the label.

Molded polymer articles having highly reflective properties may also be desirable in applications where the reflective properties may improve the aesthetic appeal of the product. For instance, trim pieces having highly reflective properties may be well suited for use in consumer appliance products, in trim pieces and bezels for automobile interiors and for trim pieces for various other consumer products.

Molded polymer articles having good reflective properties may also be used as reflectors for light-emitting diodes. Light-emitting diodes, commonly called LEDs, continue to increase in popularity as a light source for use in many and diverse applications. LEDs, for example, are displacing incandescent and other light sources in many uses and have found applications, for instance, as traffic signals, large area displays, interior and exterior lighting, cellular telephone displays, digital clock displays, displays for consumer appliances, flashlights, and the like.

The reflector for the LED can also serve as the housing for the LED and is typically made from a molded polymeric resin. For example, the polymeric resin can be injection molded to form the housing and reflector. In one embodiment, the polymeric resin is injection molded over a lead frame for integrating the lead frame into the LED assembly. In certain embodiments, the LED element located w thin the reflector can be sealed by a translucent or transparent resin. The transparent or translucent resin may serve as a lens for further enhancing the light that is emitted.

In U.S. Patent Publication No. 2007/0213458 entitled "Light-Emitting Diode Assembly Housing Comprising Poly (cyclohexanedimethanol terephthalate) Compositions", which is incorporated herein by reference, a reflector for an LED is disclosed that is made from a poly(cyclohexanedimethanol terephthalate) (hereinafter "PCT") composition.

The present disclosure is generally directed to further improvements in formulating polymer compositions that have a desirable combination of properties, such as reflectance and strength, when molded into various different articles.

SUMMARY

In general, the present disclosure is directed to a polymer composition and to molded articles made from the composition. The polymer composition generally contains a thermoplastic polymer combined with one or more components. The different components can include a pigment, such as a white pigment, a reactive modifier, a reinforcing agent such as glass fibers, an optical brightener, an impact modifier, a lubricant, a thermal stabilizer, an oxidative stabilizer, and/or an ultraviolet light stabilizer. As will be described in greater detail below, the different components can be blended with the thermoplastic polymer in a manner to produce molded articles having desired characteristics. In one embodiment, for instance, the composition can be formulated such that the resulting molded article may have excellent reflectance properties. In other embodiments, the composition may be formulated so as to have good melt flow properties, and/or good mechanical properties. In one embodiment, the composition can also be formulated so as to be well suited for bonding with silicone polymers.

As described above, in one embodiment, the polymer composition may have excellent reflectance properties. For example, the polymer composition can have an initial reflectance at 460 nm of greater than about 90%, such as greater than about 93%, such as greater than about 95%. The initial reflectance at 460 nm is generally less than 100%. The polymeric material can also have an initial whiteness index of greater than about 84, such as greater than about 92, such as greater than about 96. Of particular advantage, the polymeric material can have a whiteness index after aging at 200° C. for four hours of greater than about 50, such as greater than about 60, such as greater than about 62, such as greater than about 65, such as greater than about 68, such as even greater than about 70. In general, the whiteness index after aging at 200°C. is less than the than initial whiteness index of the material and is generally less than about 95.

The polymer composition can also have a whiteness index retention after aging at 200° C. for dour hours of greater than about 60%, such as greater than about 65%, such as greater than about 70%, such as even greater than about 75%.

In other embodiment, the polymer composition may be formulated so as to have excellent mechanical properties. For instance, in one embodiment, the polymer composition can have a notched Charpy impact strength of greater than about 2 kJ/m$^2$, such as greater than about 2.5 kJ/m$^2$. The polymer composition can also be formulated so as to have good silicone bond strength. For instance, the polymer composition can have a silicone bond strength according to a Lap-Shear Test of greater than about 25 lbf.

In general, the polymer composition contains a thermoplastic polymer, such as a thermoplastic polymer having a melting point greater than about 260° C. The thermoplastic polymer may comprise a polyester polymer including liquid crystal polymers, a fluorocarbon polymer, a polyamide polymer, and the like. In one embodiment, the thermoplastic polymer comprises poly(1,4-cyclohexanedimenthanolterephthalate).

In addition to the thermoplastic polymer, the polymer composition may optionally contain various other components. In one embodiment, for instance, the polymer composition may contain a pigment, such as a white pigment. The white pigment may be present in an amount greater than about 10% by weight, especially in applications where reflectance properties are important.

Another optional component that may be present in the composition is a reinforcing agent. The reinforcing agent may comprise fibers or an inorganic filler. In one embodiment, for instance, the composition contains glass fibers in an amount from about 10% to about 30% by weight.

Another optional component that may be present in the polymer composition is a reactive modifier. The reactive modifier reacts with the thermoplastic polymer in a manner that provides one or more benefits. For instance, the reactive modifier may serve as a chain extender that may stabilize the polymer during melt processing or may improve the light stable characteristics of the polymer.

The polymer composition may also optionally contain one or more impact modifiers. The impact modifiers may react with the thermoplastic polymer or be non-reactive. For instance, in one embodiment, the polymeric material contains a terpolymer of ethylene, methyl acrylate and glycidyl (meth) acrylate. In another embodiment, the polymeric material contains an ethylene-(methyl)acrylate copolymer. In still another embodiment, the polymeric material may include a combination of the terpolymer of ethylene, methyl acrylate and glycidyl (meth) acrylate and an ethylene-(methyl)acrylate copolymer.

In another embodiment, the polymer composition may contain a stabilizer. In one particular embodiment, the stabilizer may comprise an organophosphorus compound, such as a phosphonate stabilizer or a phosphate stabilizer.

Other features and aspects of the present disclosure are discussed in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 1 is a perspective view of one embodiment of an LED assembly made in accordance with the present disclosure;

FIG. 2 is a plan view of the LED assembly illustrated in FIG. 1;

FIG. 3 is a perspective view of another embodiment of an LED assembly made in accordance with the present disclosure;

FIG. 4 is a perspective view of one-half of a mold used for measuring spiral flow length; and FIG. 5 is a perspective view of a sample constructed in order to measure silicone bond strength according to a Lap-Shear Test.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a polymer composition and to articles made from the composition that can exhibit various properties that relate to reflectance, whiteness, flow properties during melt processing and/or mechanical properties such as impact strength. The composition of the present disclosure can be used in numerous and different end use applications. For instance, the composition can be used as a reflector for light. For example, the polymer composition may be used to produce a reflector for LED assemblies, may be used as a component in a sign, such as a lighted sign, may be used as a label, or in any other suitable application where excellent reflectance properties may be desired.

In addition to the above, the polymer composition can be used to mold various other polymer articles. Such polymer articles may include parts for consumer products, such as consumer appliances, automobile parts, including trim pieces and bezels for the interior of an automobile or for the exterior of an automobile, and the like. Although the polymer composition of the present disclosure has excellent reflective properties, the polymer composition may be selected for use in various applications where reflective properties are not needed. In these applications, the polymer composition may be selected due to its melt flow properties, strength properties, impact resistant properties, or the like.

The polymer composition of the present disclosure can contain different ingredients and components in different amounts in order to produce a formulation that is well suited for a particular end use application. In general, the polymer composition contains a thermoplastic polymer in combination with various optional components. One or more of the optional components can be combined together in a manner that optimizes certain desired properties. For example, where reflectance properties are needed, one or more pigments may be combined with the polymer composition. If reflectance properties, however, are not important in a particular application, the one or more pigments may be eliminated from the formulation and/or used in minor amounts.

In general, the polymer composition contains at least one thermoplastic polymer, and particularly at least one high temperature thermoplastic polymer. For instance, the thermoplastic polymer can have a melt temperature of greater than about 260° C., such as greater than about 270° C. such as greater than about 280° C. such as greater than about 290° C. In one embodiment, the thermoplastic polymer can have a melt temperature of less than about 500° C., such as less than about 400° C., such as less than about 350° C.

In one embodiment, the thermoplastic polymer comprises a polyester polymer, such as a poly(1,4cyclohexanedimethanol terephthalate) polymer, a liquid crystal polymer, a polyamide polymer, a fluorocarbon polymer, or mixtures thereof.

Optionally, the polymer composition may contain a pigment, such as a white pigment. Optionally the composition can also contain a reinforcing agent, such as a filler or reinforcing fibers. In accordance with the present disclosure, the composition may further contain one or more reactive modifiers. The one or more reactive modifiers may comprise polymers that react with a thermoplastic polymer in order to provide one or more benefits. Of particular advantage, reactive modifiers may be selected that do not cause unwanted yellowing of the composition during later use, especially when the composition is used as a reflector for a light source. In this regard, the composition may also be formulated so as to exclude additives and stabilizers that may cause yellowing to occur. In this regard, in one embodiment, the composition is free from some or all of any aromatic epoxy resins, and is especially free of a novolac epoxy resin.

The polymer composition of the present disclosure can be formulated so as to have excellent melt flow properties. With respect to the melt flow properties, for instance, in one embodiment, the polymer composition can have a spiral flow length of at least five inches, such as at least six inches, such as even at least seven inches. In general, the spiral flow length is less than about fifteen inches, such as less than about twelve inches. As used herein, the spiral flow length is determined at a temperature of 305° C. and at a mold temperature of 120° C. Spiral flow length is measured by injecting the polymer composition into a mold as shown in FIG. 4 (one-half of mold shown). The mold cavity is ⅟₃₂ inches thick (high) and ½ inches wide. The polymer composition is injected into the mold using a 32 mm extruder at an injection speed of 4 inches per second and a shot size of 1.8 inches. Spiral flow length generally indicates the flow characteristics of the polymer composition when being melt processed. Higher spiral flow lengths indicate the ability of the material to uniformly and evenly flow into a mold, which also indicates the ability of the material to fill any interstices of the mold that may exist. For example, a higher spiral flow length is particularly preferred when molding small parts that may have complex three-dimensional configurations, such as reflectors and housings for LED assemblies.

In addition to having a relatively high spiral flow length, polymer compositions made according to the present disclosure can also be formulated so as to have a stable viscosity. In particular, the melt viscosity of the composition during processing may not fluctuate by more than about 5%, such as no more than about 3%.

The polymer composition of the present disclosure also has a relatively high initial reflectance, and excellent reflectance stability. For instance, once molded into an article, the polymer composition of the present disclosure can have an initial reflectance at 460 nm oaf greater than about 90%, such as greater than about 93%, such as greater than about 95%. Reflectance is measured according to ASTM Test Method 1331 using a spectracolormeter. During testing, a CIE D65 daylight illuminant is used at an angle of 10°.

In addition to initial reflectance, polymer articles made according to the present disclosure can also have a relatively high initial whiteness index. Whiteness index can be measured according to WI E313. Articles made according to the present disclosure can have an initial whiteness index of greater than about 80, such as greater than about 90, such as greater than at 92, such as greater than about 95.

Of particular advantage, articles made according to the present disclosure also have great reflectance stability properties. For instance, after aging at 200° C. for four hours, the whiteness index of articles made according to the present disclosure can be at least about 50, such as at least about 60, such as at least about 70, such a at least about 72, such as at least about 74, such as even greater than about 75. The whiteness index after aging is lower than the initial whiteness index.

The reflectance stability properties of articles made according to the present disclosure can also be measured by percent retention of its whiteness index after aging at 200° C. for four hours. In particular, articles made in accordance with the present disclosure can have a percent whiteness index retention after thermal aging of greater than about 60%, such as greater than about 65%, such as greater than about 70%, such as even greater than about 75%. The percent retention is generally less than about 95%.

In one embodiment, the polymer composition can be formulated such that polymer articles made from the composition absorb light in the ultraviolet and violet region of the electromagnetic spectrum, which may be between about 300 nanometers ("nm") and about 400 nm, and re-emit light in the blue region, which may be between about 410 nm and about 470 nm. By re-emitting light in the blue region, polymer articles of the present disclosure have significantly enhanced brightness, especially when used as a reflector for a light source.

In addition to the above properties, the polymer composition of the present disclosure also has good reflow resistance properties at relatively high temperatures, such as at temperatures around 260° C. The polymer material has good silicone adhesion properties, which may be important in applications where an adhesive is used to either attach components in an LED assembly to the reflector or to attach the reflector to a substrate. Articles made according to the present disclosure also have good mechanical properties, such as good impact resistance. The material of the present disclosure can also display low moisture absorption.

As described above, the polymer composition of the present disclosure may be used in numerous applications. When the polymer composition is formulated to have good reflective properties, for instance, the polymer composition can be used to produce reflectors for a light source. In one particular embodiment, for instance, the polymer composition can be used to produce a reflector for an LED assembly.

Referring to FIGS. 1 and 2, one embodiment of an LED assembly 10 that may be made in accordance with the present disclosure is shown. In the embodiment illustrated in FIGS. 1 and 2. the LED assembly 10 is considered a side view LED. As shown, the LED assembly 10 includes a light-emitting diode 12 that is configured to emit light when a current is fed through the device. The light-emitting diode 12, for instance, may be comprised of a semiconductor chip including multiple layers of materials. The LED 12 generally includes an n-type material layer and a p-type material layer, which form a p-n junction that can be connected to a voltage source. In one embodiment, for instance, the p-type layer may comprise doped gallium aluminum arsenide, while the n-type layer may comprise doped gallium arsenide.

The LED 12 is connected to a first bonding wire 14 and to a second bonding wire 16. The bonding wires 14 and 16 are connected to a lead frame 18. The lead frame 18 includes a first lead frame portion 20 and a second lead frame portion 22. The lead frame 18 may include or be connected to an anode 24 and a cathode 26 which may also be considered a first terminal 24 and a second terminal 26.

In accordance with the present disclosure, the LED assembly 10 further includes a reflector 28 which can also serve as the housing for the LED assembly. The reflector 28, in accordance with the present disclosure, is made from a polymer composition having excellent reflectance properties.

As shown in FIGS. 1 and 2, the reflector 28 defines a cavity 30 in which the LED 12 is located. The walls of the cavity 30 generally surround the LED 12 and, in the embodiment illustrated, have a depth sufficient for the LED 12 to be recessed within the cavity.

The cavity 30 of the reflector 28 surrounds the LED 12 and serves to reflect light being emitted by the LED in an outward direction. The cavity 30 may have any suitable shape. For instance, the cavity 30 may be cylindrical, conical, parabolic, or any other suitable curved form. Alternatively, the walls of the cavity 30 may be parallel, substantially parallel, or tapered with respect to the diode 12. In the embodiment illustrated in FIG. 1, for instance, the cavity 30 has a smooth surface and is comprised of side walls 32 and 34 and end walls 30 and 38. The side walls 32 and 34 taper in an outward direction from the LED 12. The end walls 36 and 38, on the other hand, can be substantially parallel or may also taper outwardly from the LED source.

If desired, the cavity 30 of the reflector 28 may be filled with a clear material, such as a transparent material or a translucent material. For instance, the cavity 30 may be filled with an epoxy or a silicone material. In one embodiment, the material used to fill the cavity 30 may act as a lens for the light being emitted by the LED 12.

Referring to FIG. 3, another embodiment of an LED assembly 50 that may be made in accordance with the present disclosure is shown. In the embodiment illustrated in FIG. 3, a top view LED assembly is shown. The top view LED assembly 50 is similar in construction to the side view LED assembly 10 illustrated in FIGS. 1 and 2.

For instance, the top view LED assembly 50 includes an LED 52 that is positioned towards the bottom of a cavity 54 of a reflector 56. The LED 52 is also connected to a lead frame 58. In the embodiment illustrated in FIG. 3, the cavity 54 of the reflector 56 is filled with a clear material 60.

LED assemblies as shown in FIGS. 1-3 generally have relatively small dimensions. For example, the LED assemblies typically have a greatest dimension (such as height, width, depth or diameter) that is generally less than about 10 mm, such as typically less than about 8 mm. The LED assemblies typically include at least one dimension, such as depth, that is less than 5 mm, such as less than 2 mm, such as even less than 1 mm. As will be described below, the polymer composition of the present disclosure is capable of forming reflectors for LED assemblies using melt flow processing techniques. For instance, in one embodiment, the polymer composition of the present disclosure is blow molded in forming the reflectors. Of particular advantage, the composition of the present disclosure is formulated so as to have melt flow properties capable of forming hundreds of reflectors simultaneously.

As described above, the polymer composition of the present disclosure contains a high temperature thermoplastic polymer. The thermoplastic polymer, for instance, can have a melting point of at least 260° C. Various different thermoplastic polymers may be used in accordance with the present disclosure including mixtures of thermoplastic polymers. In one particular embodiment, the thermoplastic polymer comprises a poly(1,4-cyclohexanedimethanol terephthalate) polymer, which is typically referred to as a "PCT" polymer. Poly(1,4-cyclohexanedimethanol terephthalate) is a polyester that contains repeat units from a dicarboxylic acid component and a glycol component. At least about 80 mol percent, more preferably at least about 90 mol percent, and especially preferably all of the diol repeat units are derived from 1,4-cyclohexanedimethanol and are of formula (I).

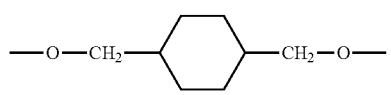
(I)

At least about 80 mol percent, more preferably at least about 90 mol percent, and especially preferably all of the dicarboxylic acid repeat units are derived from terephthalic acid and are of formula (II).

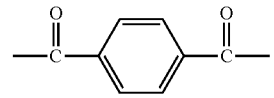
(II)

In one embodiment, the PCT polymer contains 100 mol percent of terephthalic acid or diesters. The glycol component, on the other hand, can contain a total of 100 mol percent 1,4-cyclohexanedimethanol.

In various embodiments, however, the dicarboxylic acid component may contain up to 10 mol percent of other aromatic, aliphatic, or alicyclic dicarboxylic acids such as isophthalic acid, naphthalenedicarboxylic acid, cyclohexanedicarboxylic acid, succinic acid, subacic acid, adipic acid, glutaric acid, azelaic acid, and the like.

The glycol component may also contain up to about 10 mol percent of other aliphatic or alicyclic glycols, such as diethylene triethylene glycol, ethylene glycol, propanediol, butanediol, pentanediol, hexanediol, and the like.

The PCT polymer can have an inherent viscosty (I.V.) of from about 0.3 to about 1.5 and a melting point of at least 260° C.

In one embodiment, the PCT polymer can comprise a blend of two or more different grades of PCT polymers. For instance, in one embodiment, a blend, such as a 1:1 blend, of high I.V. PCT polymer with a low I.V. PCT polymer may be used. In an alternative embodiment, a blend, such as a 2:1 blend, may be used that includes a PCT polymer wherein the dicarboxylic add component is 100 mol percent terephthalic acid and a PCT polymer in which the dicarboxylic acid component is 90 mol percent terepthalic acid and 10 mol percent isophthalic acid.

In general, the PCT polymer is present in the composition in an amount of at least about 20% by weight, such as in an amount of at least 30% by weight, such as in an amount of at least 40% by weight, such as in an amount of at least about 50% by weight, such as in an amount of at least about 60% by weight. The PCT polymer is generally present in an amount less than about 80% by weight, such as in an amount less than about 70% by weight. In one embodiment, the PCT polymer is present in an amount from about 20% by weight to about 60% by weight.

In addition to a PCT polymer, the thermoplastic polymer may comprise various other polymers. In general, any suitable thermoplastic polymer may be used in accordance with the present disclosure/ The melting point of the polymer, for instance, can be greater than about 260° C., such as greater than about 270° C., such as greater than about 280° C., such as even greater than about 290° C. The melting point of the thermoplastic polymer can generally be less than about 500° C., such as less than about 400° C., such as less than about 350° C.

Thermoplastic polymers that may be used in accordance with the present disclosure in addition to PCT polymers include polyether ether ketone polymers, other polyester polymers such as polybutylene terephthalate and polyethylene terephthalate. For instance, in one embodiment, a polybutylene terephthalate polymer and/or a polyethylene terephthalate polymer are used that have a high degree of crystallinity. Other thermoplastic polymers that may be used include polytrimethylene terephthalate and liquid crystal polymers, such as liquid crystal polyester polymers. Still other thermoplastic polymers that may be used include high temperature polyamide polymers. Such polymers may include, for instance, nylon 66, nylon 3, nylon 4, nylon 5, nylon 46, and the like. Polytetrafluoroethylene polymers and fluorinated ethylene polymers are also well suited for use in the present disclosure. Further thermoplastic polymers that may be used include ethylene-carbon monoxide polymers, styrene acrylonitrile polymers, and styrene maleic anhydride polymers.

In addition to the thermoplastic polymer, the composition may also contain one or more of various other components. For instance, when reflective properties may be important, the composition may contain at least one pigment, such as a white pigment. When present to improve reflective properties, the at least one white pigment may be present in amounts greater than about 10% by weight, such as in amounts of at least about 15% by weight. The white pigment is present in the composition in an amount sufficient to increase the reflectance of articles molded from the composition. White pigments that may be included in the composition include titanium dioxide, zinc oxide, white lead, aluminum oxide, barium sulfate, and the like.

In one embodiment, the white pigment comprises titanium dioxide. The titanium dioxide may be any sort, such as a rutile titanium dioxide. The titanium dioxide particles can have any suitable shape, such as spherical particles or elliptic particles. The titanium dioxide powder can be comprised of particles having a diameter of from about 10 nm to about 20,000 nm, such as from about 150 nm to about 500 nm.

In one embodiment, the titanium dioxide particles can be coated. For example, the titanium dioxide particles can be first coated with an inorganic coating and then optionally with an organic coating that is applied over the inorganic coating. Inorganic coatings that may be used include metal oxides. Organic coatings may include carboxylic acids, polyols, alkanolamines, and/or silicon compounds.

Examples of carboxylic acids suitable for use as an organic coating include adipic acid, terephthalic acid, lauric acid, myristic acid, palmitic acid, stearic acid, polyhydroxystearic acid, oleic acid, salicylic acid, malic acid, and maleic acid. As used herein, the term "carboxylic acid" includes the esters and salts of the carboxylic acids.

Examples of silicon compounds suitable for an organic coating include, but are not limited to, silicates, organic silanes, and organic siloxanes, including organoalkoxysilanes, aminosilanes, epoxysilanes, mercaptosilanes, and polyhydroxysiloxanes. Suitable silanes can have the formula $R_xSi(R')_{4-x}$ wherein R is a nonhydrolyzable aliphatic, cycloaliphatic, or aromatic group having from 1 to about 20 carbon atoms, and R' is one or more hydrolyzable groups such as an alkoxy, halogen, acetoxy, or hydroxy group, and X is 1, 2, or 3.

Useful suitable silanes suitable for an organic coating include one or more of hexyltrimethoxysilane, octyltriethoxysilane, nonyltriethoxysilane, decyltriethoxysilane, dodecyltriethoxysilane, tridecyltriethoxysilane, tetradecyltriethoxysilane, pentadecyltriethoxysilane, hexadecyltriethoxysilane, heptadecyltriethoxysilane, octadecyltriethoxysilane, N-(2-aminoethyl) 3-aminopropylmethyldimethoxysilane, N-(2-aminoethyl) 3-aminopropyltrimethoxysilane, 3-aminopropyltriethoxysilane, 3-glycidoxypropyltrimethoxysilane, 3-glycidoxypropylmethyldimethoxysilane, 3-mercaptopropyltrimethoxysilane and combinations of two or more thereof. In other useful silanes, R has between 8 and 18 carbon atoms and R' is one or more of chloro, methoxy, ethoxy, or hydroxy groups.

In one embodiment, the white pigment comprises Type II chalk resistance particles as classified according to ASTM Test D476. For example, in one embodiment, the white pigment comprises particles, such as metal oxide particles, that include a surface treatment that produces the chalk resistance properties. The particles, for instance, may comprise rutile titanium dioxide. The above white pigment particles may maximize the increase in initial reflectance of the resulting polymeric material while minimizing the impact the particles have on the melt viscosity of the material.

The surface treatment on the white pigment can vary as long as the particles have the required chalk resistance characteristics. In one embodiment, for instance, the white pigment comprises titanium dioxide particles that include a surface treatment containing alumina. The surface treatment may comprise alumina alone or in combination with other components. For instance, in one embodiment, the surface treatment comprises a combination of alumina and a polysiloxane.

The white pigment may, overall, have a neutral tint or have a blue tint. In one embodiment, the particles are slightly basic when combined with distilled water and measured for pH. For example, the white pigment particles may exhibit a pH of greater than about 7, such as greater than about 7.5. The pH of the particles is generally less than about 9, such as less than about 8.5.

The polymer composition of the present disclosure can also optionally contain one or more reinforcing agents, such as fillers and fibers. Such materials can include, for instance, glass fibers, wollastonite, potassium titanate, calcium carbonate, talc, mica, silica, kaolin, and the like. Such inorganic fillers may be present in the composition in an amount from about 1% to about 40% by weight, such as in an amount from about 10% to about 30% by weight.

In accordance with the present disclosure, the composition may further optionally contain one or more reactive modifiers, which may serve as stabilizers. The reactive modifiers, for instance, may comprise a material, such as a polymer, that is capable of reacting with the thermoplastic polymer, such as the PCT polymer. The reactive modifier may provide one or more benefits. For instance, in one embodiment, the reactive modifier may compatabilize the thermoplastic polymer with any other components present, especially during melt processing.

In one embodiment, the reactive modifier comprises a material that can react with carboxyl or hydroxyl end groups on the thermoplastic polymer. In this manner, the reactive modifier may act as a chain extender.

In one embodiment, the reactive modifier comprises a compound, oligomer, or polymer with one or more functional groups. The one or more functional groups are available for reaction with the thermoplastic polymer contained in the composition. Functional groups that may be present on the reactive modifier include epoxy groups, carboxylic anhydride groups, hydroxyl groups, carboxyl groups, and/or isocyanate groups. In one embodiment, the reactive modifier comprises a chain extender that attaches to the thermoplastic polymer.

Reactive modifiers that may be used in accordance with the present disclosure generally include phenoxy resins and/or epoxy resins, such as non-aromatic epoxy resins. In one embodiment, for instance, the reactive modifier comprises a modified phenoxy resin that is capable of reacting with the thermoplastic polymer. The phenoxy resin, for instance, may include hydroxyl functionality. The phenoxy resin, for instance, may have a glass transition temperature of less than about 120° C., such as less than about 110° C, such as less than about 100° C. The phenoxy resin may have a viscosity when tested in cyclohexanone at 25% NV of less than about 2500 cP, such as less than about 2300 cP.

Non-aromatic epoxy resins that may be used as the reactive modifier include 3,4-epoxycyclohexenylmethyl-3', 4'-epoxycyclohexene carboxylate, 1,4-cyclohexane dimethanoldigrycicdyl ether, hydrogenated bis-phenol-A type epoxy resin and/or tris(2,3-epoxypropyl) isocyanurate. In general, any suitable alicyclic epoxy resin may be used.

In addition to the above reactive modifiers or instead of the above reactive modifiers, the composition may contain an epoxy-functional copolymer as the reactive modifier. Exemplary copolymers having multiple epoxy pendant groups include the reaction products of one or more ethylenically unsaturated monomers (e.g. styrene, ethylene, and the like) with an epoxy-containing ethylenically unsaturated monomer (e.g. glycidyl C1-4 (alkyl) acrylate, ally glycidyl ethacryalte, and glycidyl itoconate). For example, in one embodiment the epoxy-functional copolymer is a styrene-acrylic copolymer (including an oligomer) containing glycidyl groups incorporated as side chains.

In one embodiment, the reactive modifier may comprise an anhydride. Examples may include pyromellitic dianhydride, trimellitic anhydride, 3-(triethoxysilyl) propylsuccinic anhydride, and the like. Other reactive modifiers can include various oxazolines and/or silanes. Such reactive modifiers can include phenylenebisoxazoline and 3-aminopropyltriethoxysilane.

The one or more reactive modifiers may be present in the composition in an amount sufficient to stabilize the viscosity of the composition during melt processing without causing viscosity fluctuations. In other embodiments, the one or more reactive modifiers may be present in the composition in an amount sufficient such that the composition displays desired whiteness properties, such as desired whiteness properties after being thermally aged. In general, the reactive modifiers are present in the composition in an amount from about 0.2% to about 8% by weight, such as from about 0.5% to about 5% by weight.

Of particular advantage, reactive modifiers may be selected that do not significantly increase yellowing of the composition over time. In this regard, the polymer composition can be formulated so as to be substantially or completely free of various aromatic epoxy resins. In one embodiment, for instance, the composition is free of any epoxy novolac resins, such as an epoxy cresol novolac resin.

Reactive modifiers that may be used that do not significantly increase yellowing of a molded article made from the composition can include reactive modifiers that do not have as deep color. For instance, the reactive modifier may have a color b* value according to the CIELAB Test Method of less than about 2. The CIELAB methodology is described in Pocket Guide to Digital Printing by F. Cost, Delmar Publishers Albany, N.Y. ISBN 0-8273-7592-1 at pages 144 and 145 and "Photoelectric color difference meter", Journal of Optical Society of America, volume 48, page numbers 985-995, S. Hunter, (1958), both of which are incorporated herein by reference in their entirety. More specifically, the CIELAB test method defines three "Hunter" scale values, L*, a*, and b*, which correspond to three characteristics of a perceived color based on the opponent theory of color perception and are defined as follows:

L*=Lightness (or luminosity), ranging from 0 to 100, where 0=dark and 100=light;

a*=Red/green axis, ranging from −100 to 100; positive values are reddish and negative values are greenish; and b*=Yellow/blue axis, ranging from −100 to 100; positive values are yellowish and negative values are bluish.

Color measurement can be performed using a DataColor 650 Spectrophotometer utilizing an integrating sphere with measurements made using the specular included mode., Color coordinates can likewise be calculated according to ASTM D2244-11 under an illuminant D65/10°, A/10°, or F2/10° observer, using CIELAB units.

The polymer composition of the present disclosure can further contain one or more impact modifiers. The impact modifiers can be reactive with the thermoplastic polymer, such as the PCT polymer, or non-reactive. In one embodiment, for instance, the composition contains at least one reactive impact modifier and at least one non-reactive impact modifier.

Reactive impact modifiers that may be used include ethylene-maleic anhydride copolymers, ethylene-alkyl (meth)acrylate-maleic anhydride copolymers, ethylene-alkyl (meth)acrylate-glycidyl (meth)acrylate copolymers, and the like. In one embodiment, for instance, a reactive impact modifier is used that comprises a random terpolymer of ethylene, methylacrylate, and glycidyl methacrylate. The terpolymer can have a glycidyl methacrylate content of from about 5% to about 20%, such as from about 6% to about 10%. The terpolymer may have a methylacrylate content of from about 20% to about 30%, such as about 24%.

Of particular advantage, the present inventors have discovered that the combination of a reactive impact modifier with a reactive modifier, may, in some embodiments, further improve the whiteness index of articles made according to m the present disclosure after heat aging.

In general, a reactive impact modifier may be present in the composition in an amount from about 0.05% to about 20% by weight, such as in an amount from about 0.1% to about 5% by weight.

Non-reactive impact modifiers that may be blended into the polymer composition of the present disclosure generally include various rubber materials, such as acrylic rubbers, ASA rubbers, diene rubbers, organosiloxane rubbers, EPDM rubbers, SBS or SEBS rubbers, ABS rubbers, NBS rubbers, and the like. In one embodiment, an ethylene acrylic rubber is present such as an ethylene acrylic ester copolymer. Particular examples of non-reactive impact modifiers include ethylene butylacrylate, ethylene (methyl)acrylate, or 2 ethyl hexyl acrylate copolymers. In one particular embodiment, an ethylene (methyl)acrylate copolymer is present in the composition that contains (methyl)acrylate in an amount of from about 20% to about 30% by weight, such as in an amount of about 24% by weight.

In one particular embodiment, the composition of the present disclosure includes a combination of an ethylene (methyl)acrylate copolymer combined with a terpolymer of ethylene, methylacrylate and glycidyl methacrylate.

When present in the composition, non-reactive impact modifiers can be included in amounts of from about 0.05% to about 15% by weight, such as in an amount from about 0.1% to about 8% by weight.

As described above, the polymer composition of the present disclosure may contain a mixture of thermoplastic polymers. For instance, in one embodiment, the composition may contain a PCT polymer in combination with one or more thermoplastic polymers. The other thermoplastic polymers can be present in an amount from about 1% to about 15% by weight. Other thermoplastic polymers that may be included include other polyester polymers, a liquid crystal polymer, or mixtures thereof. Other thermoplastic polyester polymers that may be included in the composition include poly(ethylene terephthalate), poly(propylene terephthalate), poly(butylene terephthalate), acid-modified PCT copolyesters, poly(ethylene naphthalate), poly(butylene naphthalate), atiphatic polyesters such as polyester glutarate, and the like. The inclusion of small amounts of other polyester polymers or a liquid crystal polymer may, in some embodiments, improve the processability of the composition. In one embodiment, for instance, the composition may contain an aromatic liquid crystal polyester polymer in an amount of from about 2 to about 15% by weight.

Another additive that may be present in the polymer composition is a polytetrafluoroethylene polymer. Inclusion of a polytetrafluoroethylene polymer may enhance the reflectance and the whiteness index of articles made from the polymer composition. The polytetrafluoroethylene polymer may be added to the composition in the form of a fine powder having an average particle size of less than about 50 microns, such as less than about 10 microns. In one embodiment, for instance, the polytetrafluoroethylene powder may have an average particle size of from about 1 micron to about 8 microns. The polytetrafluoroethylene polymer may be present in the composition in an amount from about 0.05% to about 10% by weight, such as from about 0.1% to about 6% by weight.

In one embodiment, the polymer composition can also include a lubricant. The lubricant may comprise, for instance, a polyethylene wax, an amide wax, a montanic ester wax, a polyol ester, or the like. A lubricant, in certain embodiments, for instance, may comprise a polyethylene glycol-dilaurate and/or a neopentyl glycol dibenzoate. In one particular embodiment, the lubricant may comprise an oxidized polyethylene wax. The polyethylene wax may have a density of from about 0.94 g/cm$^3$ to about 0.96 g/cm$^3$. When present, the lubricant may be included in the composition in an amount from about 0.05% to about 6% by weight, such as from about 0.1% to about 4% by weight.

In addition to the above, the composition may contain various other additives and ingredients. For instance, the composition may contain various thermal and oxidative stabilizers, ultraviolet light stabilizers, brighteners, and the like. In one particular embodiment, the composition may include a suitable optical brightener, such as a benzoxazole. For example, the composition may include benzoxazole, 2,2'-(1,2-ethenediyldi-4,1-phenylene)bis-, which has CAS Registry Number 1533-45-5, or another suitable benzoxazole. The optical brightener may further enhance the reflectance.

In one embodiment, the polymer composition may contain a sterically hindered amine light stabilizer. When present in the composition, hindered amine light stabilizers have been found to provide various advantages and benefits. For instance, sterically hindered amine light stabilizers have been found to further improve the reflectance properties of the material, especially after long term aging. Light stabilizers may be present in the composition in an amount from about 0.05% to about 3% by weight, such as in an amount from about 0.05% to about 1% by weight. In one particular embodiment, a hindered amine light stabilizer may be used in conjunction with a hindered phenolic antioxidant and a phosphorous-containing stabilizer.

In one embodiment, the phosphorous-containing stabilizer may comprise organophosphorus compound containing at least one phosphorus having a +5 valence state. The organophosphorus compound, for instance, may comprise a phosphonate or a phosphate. A phosphorus stabilizer as described above has been found to significantly improve whiteness stability while presenting the ability of the polymer composition to adhere to silicone resins.

The phosphonate stabilizer provides the above benefits while being contained in the polymer composition at relatively minor amounts. For instance, the organophosphorus compound may be present in the polymer composition in an amount of less than about 5% by weight, such as in an amount of less than about 3% by weight, such as in an amount of less than about 2% by weight, such as even in an amount less than about 1% by weight. For instance, the organophosphorus compound may be present in the polymer composition in an amount from about 0.01% to about 3% by weight, such as from about 0.01% to about 2% by weight.

In one embodiment, the stabilizer may comprise an organophosphorus compound having the following phosphorus group.

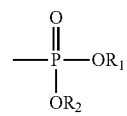

In one embodiment, a phosphonate stabilizer may be used having the following formula:

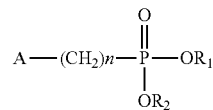

Wherein
R1 is H, C1-C20 alkyl, unsubstituted or C1-C4 alkyl-substituted phenyl or naphthyl,
R2 is H, C1-C20 alkyl, unsubstituted or C1-C4 alkyl-substituted phenyl or naphthyl, or Mr+r wherein Mr+ is an r-valent metal cation or ammonium ion;
n is an integer from 0 to 6, and r is an integer from 1 to 4;
A is hydrogen, —X—C(O)—OR8 or a radical of

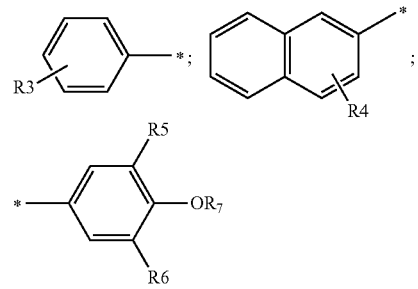

R3 or R4 is H, C1 to C18 alkyl, OH, halogen or C3-C7 cycloalkyl;
R5 or R6 is hydrogen, C1-C4 alkyl, cyclohexyl, or cyclohexyl which is substituted by 1-3 C1-C4 alkyl groups;
R7 is hydrogen, methyl, trimethylsilyl, benzyl, phenyl, sulfenyl or C1-C8 alkyl;
R8 is hydrogen, C1-C10 alkyl or C3-C7 cycloalkyl; and
X is phenylene, C1-C4 alkyl group-substituted phenylene or cyclohexylene.

Particular examples of phosphonates that may be used according to the present disclosure include phenyl phosphonates and benzyl phosphonates, such as diethyl 1-phenyl ethyl phosphonate, diethyl 2-phenyl ethyl phosphonate, diethyl benzyl phosphonate, or mixtures thereof. Particular phosphonate, compounds include, for instance:

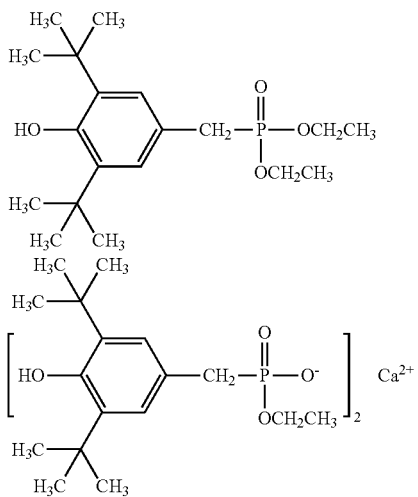

In another embodiment, a phosphate stabilizer is used that has the following formula:

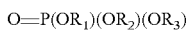

$O=P(OR_1)(OR_2)(OR_3)$

When using a phosphate stabilizer, the phosphate stabilizer may comprise an organophosphorus compound that has the same phosphorus group as described above. In one embodiment, the phosphate stabilizer may have the following formula:

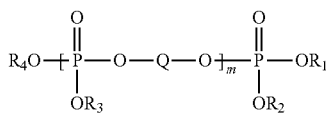

Wherein
$R_1R_2$, $R_3$, and $R_4$ are H, C1-C20 alkyl, unsubstituted or C1-C10 alkyl-substituted phenyl or naphthyl;
m is an integer of 1 to 10;
Q is a radical of

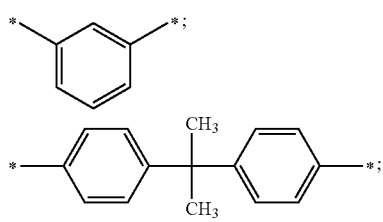

*—$(CH_2)_p$—*
p is an integer of 1 to 4;

Particular examples of phosphates that may be used according to the present disclosure include triphenyl phosphate, tributyl phosphate, tricresyl phosphate, 2-ethylhexyl diphenyl phosphate, cresyl diphenyl phosphate, oligomeric ethyl ethylene phosphate, bisphenol A bis(diphenyl phosphate), resorcinol bis(diphenyl phosphate), or mixtures thereof.

In order to produce articles in accordance with the present disclosure, the polymer composition, in one embodiment, can comprise a melt-mixed blend, wherein all of the polymeric components are well-dispersed within each other and all of the non-polymeric ingredients are well-dispersed in and bound by the polymer matrix, such that the blend forms a unified whole.

Any melt-mixing method may be used to combine the polymeric components and non-polymeric ingredients. For example, in one embodiment, the polymeric components and the non-polymeric components may be added to a melt mixer, such as for example a single or twin-screw extruder, a blender, a kneader, or a Banbury mixer, either all at once through a single step addition, or in a stepwise fashion and then melt-mixed.

The blended composition can then be molded into any desired shape through any suitable molding process. For instance, in one embodiment, articles are formed through injection molding. During injection molding, the temperature of the composition may be from about 280° C. to about 350° C. The temperature of the molds, on the other hand, may be in a range of from about 80° C. to about 150° C.

In one embodiment, the melt viscosity of the polymer composition when measured by a capillary rheometer 305° C. under 1000 sec$^{-1}$ shear rate (ASTM Test D-3835-08) can be less than about 200 Pa.s, such as less than about 150 Pa.s, such as less than about 100 Pa.s, such as less than about 80 Pa.s, such as less than about 70 Pa.s, such as less than about 60 Pa.s. In general, the melt viscosity of the polymer under the above conditions is greater than about 10 Pa.s, such as greater than about 20 Pa.s. In one particular embodiment, the melt viscosity is from about 40 Pa.s, to about 80 Pa.s.

As described above, the polymer composition of the present disclosure is particularly well suited for producing reflectors for LED assemblies. The reflectance properties of the polymer are particularly well suited for use with white LEDs. The LED reflector may be in the form of a single piece or may be formed from two or more subparts. In one embodiment, the polymer composition is injection molded over the lead frame as shown in FIGS. 1 and 2. In this manner, the lead frame and the reflector become integrated together. The semiconductor light-emitting diode chip can then be mounted within the cavity of the reflector and connected to the lead frame. The LED can be bonded to the lead frame using the bonding wires. The entire assembly can be encased or the cavity defined by the reflector can be filled with a core material such as a solid epoxy that can form lens for focusing the light in a single direction.

Molded articles made in accordance with the present disclosure not only exhibit good adhesion properties to resins, such as silicone and epoxy polymers, but also exhibit excellent light reflective and light stable properties. When tested for bond strength to silicone resins, for instance, the polymeric composition may exhibit silicone bond strengths according to the Lap-Shear Test of greater than about 25 lbf, such as greater than about 40 lbf, such as greater than about 50 lbf, such as even greater than about 60 lbf. The Lap-Shear Test is described in greater detail in the examples below.

LED assemblies made in accordance with the present disclosure can be used in numerous and different applications. For instance, the LED assemblies can be used in traffic signal lights, LCD displays, backlights, cellular telephones, automotive display lights, automotive headlamps, flashlights, interior lighting, streetlights, and in exterior lighting applications.

In addition to being used in LED assemblies, the polymer composition of the present disclosure can also be used to make venous other articles. For instance, the polymer composition can be used to produce any article where good light reflectance properties are desired. For instance, molded articles made according to the present disclosure can be used in signs and labels in order to improve the visual appearance of the item. In one embodiment, for instance, a molded article made in accordance with the present disclosure may be used in a lighted sign, such as an exit sign.

Other applications of the polymer composition include use as a roofing material or used as a component in a solar cell. The polymer composition may also be used to produce trim pieces and bezels for consumer products, such as consumer appliances. In other embodiments, the polymer composition may be used to mold interior trim pieces for vehicles, such as automobiles.

The present disclosure may be better understood with reference to the following examples. The following examples are presented below by way of illustration and not by way of limitation.

EXAMPLE NO. 1

Table 1 below lists various compositions that were prepared by melt compounding the components shown in the table using a 32 mm twin-extruder operating at 300° C., using a screw speed of about 350 rpm and a melt temperature of from about 320° C. to about 330° C. Upon exiting the extruder, the compositions were cooled and pelletized.

The compositions were molded into ISO tensile bars according to ISO Method 527-1/2 using a mold temperature of about 120° C. Tensile properties of the samples were determined using the test method above. Charpy impact strengths and Notched Charpy impact strengths were determined following ISO Test 179.

Initial reflectance at 460 nm was determined for each composition using ASTM Test Method E1331 using a CIE D65 daylight illuminant at 10° by a spectracolormeter DataColor 600. Measurements were done on the tensile bars. A higher reflectance number indicates less absorption or loss of light.

The initial whiteness index and the whiteness index after aging were determined using the same reflectance scan based on WI E313. Higher whiteness index numbers indicate better whiteness.

The following results were obtained:

TABLE NO. 1

|  | Sample 1 | Sample 2 | Sample 3 | Sample 4 | Sample 5 | Sample 6 | Sample 7 | Sample 8 | Sample 9 |
|---|---|---|---|---|---|---|---|---|---|
| Composition (wt %) | | | | | | | | | |
| PCT polymer | 54.5 | 47.4 | 51.9 | 46.9 | 49.9 | 47.9 | 47.8 | 40.8 | 43 |
| Chopped Glass Fiber | 20 | 16 | 16 | 16 | 16 | 16 | 18 | 18 | 16 |
| Titanium Dioxide | 25 | 25 | 20 | 25 | 20 | 20 | 20 | 20 | 20 |
| Oxidized polyethylene wax |  | 0.5 | 0.5 | 0.5 | 0.5 | 0.5 | 0.4 | 0.4 | 0.5 |
| Phenolic antioxidant | 0.2 | 0.25 | 0.25 | 0.25 | 0.25 | 0.25 | 0.03 | 0.03 | 0.3 |
| Phosphite stabilizer | 0.3 | 0.3 | 0.3 | 0.3 | 0.3 | 0.3 | 0.03 | 0.03 |  |
| Hindered amine light stabilizer |  |  |  |  |  |  | 0.44 | 0.44 | 0.15 |
| Epoxy cresol novolac resin |  | 0.5 |  |  |  |  |  |  |  |
| Benzoxazole,2,2'-(1,2-ethenediyldi-4,1-phenylene)bis |  | 0.05 | 0.05 | 0.05 | 0.05 | 0.05 | 0.1 | 0.1 | 0.05 |
| Ethylene, methyl acrylate, glycidyl methacrylate terpolymer |  | 1 |  | 1 |  |  | 0.5 | 0.5 | 0.5 |
| Phenoxy resin |  |  | 2 | 1 | 2 | 2 | 1 | 1 | 1 |
| Polytetrafluoroethylene powder |  |  |  |  | 2 | 4 | 3 |  |  |
| Ethylene-methylacrylate copolymer |  | 3 | 3 | 3 | 3 | 3 | 3 | 3 | 1.5 |
| Talc |  | 2 | 2 | 2 | 2 | 2 | 2 | 2 | 2 |
| N,N' ethylene bisstearamide |  |  |  |  |  |  | 0.7 | 0.7 | 1 |
| Polybutylene terephthalate |  | 4 | 4 | 4 | 4 | 4 | 3 | 3 | 8 |
| Liquid Crystal Polymer |  |  |  |  |  |  |  | 10 | 6 |
| Total (wt %) | 100 | 100 | 100 | 100 | 100 | 100 | 100 | 100 | 100 |
| Properties | | | | | | | | | |
| Tensile Strength (Mpa) | 61 | 73 | 84 | 76 | 83 | 86 | 69 | 86 | 74 |
| Elongation at Break (%) | 0.9 | 1.9 | 1.8 | 1.9 | 1.8 | 1.7 | 2.0 | 1.7 | 1.6 |
| Notched Charpy Impact (KJ/m$^2$) | 2.5 | 4.8 | 3.9 | 4.1 | 3.9 | 3.9 | 3.6 | 3.6 | 3.2 |
| Unnotched Charpy Impact (KJ/m$^2$) | 19 | 38 | 32 | 36 | 34 | 33 | 35 | 25 | 25 |
| R % at 460 nm | 90 | 91 | 96 | 95 | 96 | 97 | 97 | 93 | 92 |
| Initial Whiteness Index | 81 | 84 | 97 | 93 | 96 | 96 | 99 | 90 | 87 |
| Whiteness Index after aging at 200° C. for 4 hr | 37 | 26 | 72 | 78 | 70 | 75 | 62 | 65 | 66 |
| WI Retention after aging (%) | 45.7 | 31.0 | 74.2 | 83.9 | 72.9 | 78.1 | 62.6 | 72.2 | 75.9 |

As shown in the table above, the polymer composition of Sample 1 did not contain a reactive modifier. Sample No. 2, on the other hand, contained an epoxy cresol novolac resin. In Sample 2, the whiteness index after aging was severely reduced.

The compositions made according to the present disclosure displayed excellent initial reflectance, excellent initial whiteness index and displayed excellent whiteness index properties after aging.

EXAMPLE NO. 2

Table 2 below lists various compositions that were prepared by melt compounding the components shown in the table using a 32 mm twin-extruder operating at about 300° C., using a screw speed of about 300 rpm and a melt temperature of from about 320° C. to about 330° C. Upon exiting the extruder, the compositions were cooled and pelletized.

The compositions were molded into ISO tensile bars according to ISO method 527-1/2 using a mold temperature of about 120° C.

the test method above. Charpy impact strengths and Notched Charpy impact strengths were determined following ISO Test 179.

The reflectance at 460 nm was determined for each composition using the ASTM E1331 method and using CIE D65 daylight illuminant at 10 degrees by spectracolormeter DataColor 600. Measurements were done on tensile bars, Higher reflectance number indicates less absorption or loss of light. A complete reflectance is 100%.

Whiteness Index (WI) was determined using the same reflectance scan based on WI E313. WI of each composition was also measured on tensile bars heat aged at 200° C. for 4 hours. Higher WI numbers indicate better whiteness.

Silicone adhesion was tested according to a peel test and according to a Lap-Shear Test According to the peel test, a silicone resin is mixed and cast as a layer on the tensile bars described above. The silicone resin used is Dow Corning SYLGARD 577A/B (in a 10:1 ratio). The above silicone resin is a silicone elastomer. Once the silicone resin is applied to the tensile bar, the part is cured at 180° C. for 15 minutes in an oven and then removed from the oven and

TABLE 2

| Components | Sample 1 | Sample 2 | Sample 3 | Sample 4 | Sample 5 | Sample 6 | Sample 7 | Sample 8 | Sample 9 | Sample 10 | Sample 11 |
|---|---|---|---|---|---|---|---|---|---|---|---|
| PCT polymer | 48.3 | 48.5 | 48.5 | 50 | 50 | 48.3 | 50 | 49.2 | 55 | 53.7 | 49 |
| Chopped glass fibers | 18 | 18 | 18 | 18 | 18 | 18 | 18 | 18 | 16 | 20 | 18 |
| TiO2 rutile pigment | 20 | 20 | 20 | 20 | 20 | 20 | 20 | 20 | 18 | 20 | 20 |
| Phosphite stabilizer | | | | 0.3 | | | | | | | |
| Tetra(2,4-di-tert-butylphenyl)biphenyl-4,4'-diyl-diphosphonite | | | | | 0.3 | | | | | | |
| Pentaerythiritoltetrastearate | 0.6 | 0.6 | 0.6 | 0.6 | 0.5 | 0.5 | 0.5 | 0.9 | 0.9 | 0.5 | 0.4 |
| Phosphonate Stabilizer | | | | | | 0.3 | 0.1 | 0.6 | 0.3 | | 0.3 |
| Phosphate Stabilizer | | | | | | | | | | 2 | 1 |
| Oxidized polyethylene wax | 0.5 | 0.5 | 0.5 | 0.35 | 0.35 | 0.5 | 0.5 | 0.5 | 0.5 | 0.5 | 0.5 |
| Pentaerythiritoltetrakis(3-(3,5di-tert-butyl-4-dyroxyphenyl)propionate) | 0.2 | 0.25 | 0.3 | 0.2 | 0.2 | 0.2 | 0.2 | 0.2 | 0.2 | 0.2 | 0.2 |
| Bis (2,4-di-t-butylphenyl)PentraerythritolDiphosphite | 0.3 | 0.05 | | | | | | | | | |
| 2,5-thiophenediylbis(5-tert-butyl-1,3-benzoxazole) | 0.1 | 0.1 | 0.1 | 0.05 | 0.05 | 0.1 | 0.1 | 0.1 | 0.1 | 0.1 | 0.1 |
| Ethylene, methyl acrylate, glycidyl methacrylate terpolymer | 1 | 1 | 1 | 0.5 | 0.5 | 1 | 0.5 | 0.5 | | | 0.5 |
| Phenoxy resin | 1 | 1 | 1 | 1 | 1 | 1 | 1 | 1 | 1 | 1 | 1 |
| Ethyl-methylacrylate copolymer | 4 | 4 | 4 | 3 | 3 | 4 | 3 | 3 | | | 3 |
| Magnesium silicate hydrate; talc nucleant | 2 | 2 | 2 | 2 | 2 | 2 | 2 | 2 | 2 | 2 | 2 |
| Polybutylene terephthalate | 4 | 4 | 4 | 4 | 4 | 4 | 4 | 4 | 6 | | 4 |
| Total (weight %) | 100 | 100 | 100 | 100 | 100 | 100 | 100 | 100 | 100 | 100 | 100 |

In the examples, the phosphonate stabilizer used was calcium bis[monoethyl(3,5-di-tert-butyl-4-hydroxylbenzyl)phosphonate]. The phosphate stabilizer used was triphenyl phosphate.

Table 3 below depicts the properties of the compositions shown in Table 2. Tensile properties were determined using cooled to room temperature. The silicone layer is peeled by hand to check for adhesion. If the silicone layer peels easily, the test is a failure. If the silicone cannot be peeled off by hand, however, the adhesion to silicone passes.

The second silicone adhesion test method is a Lap-Shear Test. The PCT composition is molded into ISO tensile bars.

The bar is then cut into half sections. The two pieces of half sections are placed on a 2° copper strip with a silicone adhesive layer adhering the copper strip to the test pieces, The silicone adhesive used is a LED encapsulate silicone, which is Dow Corning OE 6630A/B silicone resin. The two parts of the silicone resin are mixed in a 1:4 ratio. The half bars and copper strip are cured at 150° C. for 2 hours, and then allowed to cool down. The bonded tensile bars are tested by a tensile machine to obtain the peak load for breaking the bond at speed of 1 inch/min at room temperature (23°C.). In particular, each half section of the tensile bar is placed in the jaws of the tensile machine. The peak load is recorded when one of the half sections releases from the copper strip. FIG. 5 illustrates the two half sections attached to the copper strip by the silicone resin.

TABLE 3

| Properties | Sample 1 | Sample 2 | Sample 3 | Sample 4 | Sample 5 | Sample 6 | Sample 7 | Sample 8 | Sample 9 | Sample 10 | Sample 11 |
|---|---|---|---|---|---|---|---|---|---|---|---|
| Tensile Modulus (Mpa) | 6381 | 6232 | 6244 | 6380 | 6372 | 6506 | 6290 | 6161 | 6310 | 8277 | 6170 |
| Elongation at Break (%) | 2.1 | 2.1 | 2 | 1.9 | 1.8 | 2 | 2 | 2 | 1.2 | 1.4 | 1.7 |
| Charpy Impact (KJ/m$^2$) | 33 | 36 | 32 | 31 | 30 | 34 | 32 | 36 | 15 | 24 | 30 |
| Initial Reflectance at 450 nm (%) | 99.7 | 99.7 | 99.7 | 94.4 | 93.8 | 100 | 99.6 | 100 | 99.8 | 99.8 | 99.5 |
| Whiteness Index before aging | 107 | 105 | 105 | 91 | 89 | 107 | 104 | 105 | 107 | 106 | 106 |
| Whiteness Index after aging at 200° C. for 4 hr | 89 | 72 | 52 | 63 | 61 | 90 | 85 | 92 | 90 | 90 | 94 |
| Whiteness Index retention after for 200° C. 4 hr | 83.2% | 68.6% | 49.5% | 69.2% | 68.5% | 84.1% | 81.7% | 87.6% | 84.1% | 84.9% | 88.7% |
| Silicone Adhesion (Sylgard 577)-peeling | Failed | Failed | Passed | Failed | Failed | Passed | Passed | Passed | Passed | Passed | Passed |
| Silicone Adhesion (OE 6630)-lap shear peak load (lbf) | 0 | 10 | 64 | 0 | 0 | 66 | 65 | 66 | 62 | 63 | 65 |

As shown above, compositions made with the phosphonate or phosphate stabilizer displayed improved reflectance stability and silicone adhesion.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A polymer composition comprising:
a thermoplastic polymer having a melting point greater than about 260° C., the thermoplastic polymer comprising a polyester polymer, the thermoplastic polymer being combined with a pigment and optionally with at least one reactive modifier, the polymer composition having an initial reflectance of greater than about 90% at 460 nm and having a whiteness index retention after aging at 200° C. for four hours of greater than about 60%, the polymer composition also having a melt viscosity at a shear rate of 1,000/sec and at 305° C. of less than about 200 Pa.s.

2. A polymer composition as defined in claim 1, wherein the polymer composition has a whiteness index after aging at 200° C. for four hours of greater than about 50.

3. A polymer composition as defined in claim 1, wherein the polymer composition has an initial whiteness index of greater than about 84.

4. A polymer composition as defined in claim 1, wherein the polymer composition has an initial whiteness index of greater than about 84 and wherein the polymer composition has a whiteness index after aging at 200° C. for four hours of greater than about 60.

5. A polymer composition as defined in claim 1, wherein the polymer composition has a whiteness index after aging at 200° C. for four hours of greater than about 50 and has an initial whiteness index of greater than about 84.

6. A polymer composition as defined in claim 1, wherein the polymer composition has a melt viscosity at a shear rate of 1,000/sec and at 305° C. of less than about 100 Pa.s.

7. A polymer composition as defined in claim 1, wherein the polymer composition has a silicone bond strength according to a Lap-Shear Test of greater than about 25 lbf.

8. A polymer composition as defined in claim 1, further comprising an impact modifier.

9. A polymer composition as defined in claim 8, wherein the impact modifier comprises a reactive impact modifier.

10. A polymer composition as defined in claim 1, wherein the pigment composes a white pigment.

11. A polymer composition as defined in claim 10, wherein the white pigment is present in the polymer composition in an amount from about 10% to about 30% by weight and wherein the polymer composition further contains glass fibers in an amount from about 10% to about 30% by weight.

12. A polymer composition as defined in claim 1, wherein the thermoplastic polymer comprises poly(1,4-cyclohexanedimethanol terephthalate).

13. A polymer composition as defined in claim 12, wherein the polymer composition further comprises a polybutylene terephthalate polymer, a polyethylene terephthalate polymer, a polytetrafluoroethylene polymer, or mixtures thereof.

14. A polymer composition as defined in claim 12, wherein the composition contains at least one reactive modifier.

15. A polymer composition as defined in claim 14, wherein the reactive modifier comprises a polymer with functional groups that react with hydroxyl groups or carboxyl groups.

16. A polymer composition as defined in claim 14, wherein the reactive modifier has a color b* of less than about 2 according to the CIELAB Color Scale.

17. A polymer composition as defined in claim 14, wherein the reactive modifier comprises a phenoxy polymer, an epoxy polymer, an anhydride polymer, or a silane polymer.

18. A polymer composition as defined in claim 14, wherein the reactive modifier comprises 3,4-epoxycyclohexenylmethyl-3',4'-epoxycyclohexene carboxylate, 1,4-cyclohexane dimethanoldigrycicdyl ether, hydrogenated bisphenol-A type epoxy resin or tris(2,3-epoxypropyl) isocyanurate.

19. A polymer composition as defined in claim 14, wherein the reactive modifier comprises a modified phenoxy resin.

20. A polymer composition as defined in claim 14, wherein the reactive modifier comprises pyromellitic dianhydride, trimellitic anhydride, 3-(triethoxysilyl) propylsuccinic anhydride, phenylenebisoxazoline, or 3-aminopropyltriethoxysilane.

21. A molded article made from a polymer composition, a polymer composition comprising:
a thermoplastic polymer having a melting point greater than about 260° C., the thermoplastic polymer comprising a polyester polymer, the thermoplastic polymer being combined with a pigment and optionally with at least one reactive modifier, the polymer composition having an initial reflectance of greater than about 90% at 460 nm and having a whiteness index retention after aging at 200° C. for four hours of greater than about 60%, the polymer composition also having a melt viscosity at a shear rate of 1,000/sec and at 305° C. of less than about 200 Pa.s.

22. A molded article as defined in claim 21, wherein the polymer composition further comprises an organophosphorus compound, the organophosphorus compound including a phosphorus group as follows:

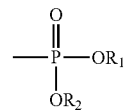

Wherein
R1 is H, C1-C20 alkyl, unsubstituted or C1-C4 alkyl-substituted phenyl or naphthyl; and
R2 is H, C1-C20 alkyl, unsubstituted or C1-C4 alkyl-substituted phenyl or naphthyl, or Mr+r wherein Mr+ is an r-valent metal cation or ammonium ion.

23. A molded article as defined in claim 21, wherein the thermoplastic polymer comprises poly(1,4-cyclohexanedimethanol terephthalate).

24. A molded article as defined in claim 23, wherein the polymer composition has a whiteness index after aging at 200° C. for four hours of greater than about 50 and has an initial whiteness index of greater than about 84.

25. A molded article as defined in claim 23, wherein the composition contains at least one reactive modifier.

26. A molded article as defined in claim 25, wherein the reactive modifier comprises a phenoxy polymer, an epoxy polymer, an anhydride polymer, or a silane polymer.

27. A molded article as defined in claim 26, wherein the pigment comprises a white pigment, and wherein the white pigment is present in the polymer composition in an amount from about 10% to about 30% by weight and wherein the polymer composition further contains glass fibers in an amount from about 10% to about 30% by weight.

* * * * *